US011436600B2

(12) United States Patent
Ghosh et al.

(10) Patent No.: US 11,436,600 B2
(45) Date of Patent: Sep. 6, 2022

(54) SYSTEM AND METHOD FOR LINKING ENCRYPTED RECORDS

(71) Applicant: MASTERCARD INTERNATIONAL INCORPORATED, Purchase, NY (US)

(72) Inventors: Debashis Ghosh, Charlotte, NC (US); Ina Goldberg, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 421 days.

(21) Appl. No.: 16/422,551

(22) Filed: May 24, 2019

(65) Prior Publication Data
US 2019/0279203 A1 Sep. 12, 2019

Related U.S. Application Data

(63) Continuation of application No. 13/950,911, filed on Jul. 25, 2013, now abandoned.

(51) Int. Cl.
G06Q 20/38 (2012.01)
G06Q 20/40 (2012.01)
G06Q 20/34 (2012.01)

(52) U.S. Cl.
CPC .......... *G06Q 20/383* (2013.01); *G06Q 20/34* (2013.01)

(58) Field of Classification Search
None
See application file for complete search history.

(56) References Cited

U.S. PATENT DOCUMENTS

| 8,346,661 B2 * | 1/2013 | Allison, Jr. ............ G06Q 40/12 705/14.27 |
| 2003/0167227 A1 * | 9/2003 | Mellinger .............. G06Q 40/00 705/39 |

(Continued)

OTHER PUBLICATIONS

Churches, Tim, and Peter Christen. "Some Methods for Blindfolded Record Linkage—BMC Medical Informatics and Decision Making." BioMed Central, BioMed Central, Jun. 28, 2004, https://bmcmedinformdecismak.biomedcentral.com/articles/10.1186/1472-6947-4-9. (Year: 2004).*

*Primary Examiner* — Kito R Robinson
*Assistant Examiner* — Shacole C Tibljas
(74) *Attorney, Agent, or Firm* — Armstrong Teasdale LLP

(57) ABSTRACT

A computer-based method for associating ownership of anonymous payment cards uses a computer device including a processor in communication with a transaction database. The method includes identifying a target account number for a payment card from the transaction database, identifying a set of transaction times associated with the target account number from the transaction database, and comparing the target account number to each candidate account number of a set of candidate account numbers from the transaction database. Comparing the target account number includes identifying a first candidate set of transaction times associated with a first candidate account number of the set of candidate account numbers, comparing the target set of transaction times to the first candidate set of transaction times, and identifying the first candidate account number as a match candidate if the target set of transaction times and first candidate set of transaction times do not include overlapping transactions.

20 Claims, 7 Drawing Sheets

(56) References Cited

U.S. PATENT DOCUMENTS

| | | | |
|---|---|---|---|
| 2010/0174589 A1* | 7/2010 | Asai | G06Q 30/0229 |
| | | | 705/14.27 |
| 2011/0093327 A1* | 4/2011 | Fordyce, III | G06Q 30/0224 |
| | | | 705/14.66 |
| 2011/0208586 A1* | 8/2011 | Joa | G06Q 30/0255 |
| | | | 235/375 |
| 2011/0231305 A1* | 9/2011 | Winters | G06Q 30/02 |
| | | | 705/1.1 |
| 2012/0066064 A1* | 3/2012 | Yoder | G06Q 30/00 |
| | | | 705/14.53 |
| 2012/0109734 A1 | 5/2012 | Fordyce, III et al. | |
| 2014/0095251 A1* | 4/2014 | Huovilainen | G06Q 30/0201 |
| | | | 705/7.29 |
| 2014/0337090 A1* | 11/2014 | Tavares | G06Q 50/01 |
| | | | 705/7.29 |

* cited by examiner

SYSTEM AND METHOD FOR LINKING ENCRYPTED RECORDS

This application is a continuation application of U.S. patent application Ser. No. 13/950,911, filed Jul. 25, 2013, entitled "SYSTEM AND METHOD FOR ANALYZING ANONYMOUS PAYMENT CARD DATA", the disclosure of which is hereby incorporated by reference in its entirety.

BACKGROUND OF THE DISCLOSURE

This disclosure relates generally to analyzing anonymous payment card data and, more particularly, to a system and method for associating ownership of multiple payment cards to a single owner using transaction information having anonymous payment card identifiers.

Due to data privacy guidelines throughout the world, there is a push toward "anonymization" of payment card transaction data. In one instance, the focus is on restricting personally identifiable information ("PII"), thus many financial institutions mask this information by anonymization of payment card transaction data (i.e., encrypting the transaction data associated with payment card transactions). One mechanism for anonymization is encryption. The encryption of transaction data, such as a consumer's primary account number ("PAN") after a purchase, ensures that only the holder of the private decryption key is able to see the account information in its decrypted form. Such mechanisms of encrypting transaction data help ensure a cardholder's information security and well as protecting the liability of the various financial institutions involved in payment card networks. The anonymization of payment card transaction data, however, hides ownership identity for other beneficial business-related uses.

Financial institutions may analyze consumer transaction data to, for example, offer targeted services. A consumer using a payment card may be targeted for a particular rewards program based on that consumer's particular use patterns. When the consumer uses multiple payment cards, usage data may be collected across all of the consumer's cards. If common ownership between payment cards is known, financial institutions benefit from a broader understanding of a consumer's activities due to the more complete view of the consumer's purchasing activities. However, when payment transaction data is anonymized, common ownership between multiple payment cards is hidden. As such, some known systems cannot determine common ownership between a single consumer's multiple payment card accounts when the transaction information is encrypted. What is needed is a system and method for associating common ownership of encrypted payment card accounts.

BRIEF DESCRIPTION OF THE DISCLOSURE

In one aspect, a computer-based method for associating ownership of anonymous payment cards is provided. The method uses a computer device including a processor in communication with a transaction database. The method includes identifying, by the processor, a target account number for a payment card from the transaction database. The method also includes identifying, by the processor, a set of transaction times associated with the target account number from the transaction database. The method further includes comparing, by the processor, the target account number to each candidate account number of a set of candidate account numbers from the transaction database. Comparing the target account number includes identifying a first candidate set of transaction times associated with a first candidate account number of the set of candidate account numbers. Comparing the target account number also includes comparing the target set of transaction times to the first candidate set of transaction times. Comparing the target account number further includes identifying the first candidate account number as a match candidate if the target set of transaction times and the first candidate set of transaction times do not include overlapping transactions.

In another aspect, a computer device for associating ownership of anonymous payment cards is provided. The computer device includes a processor communicatively coupled to a memory. The computer device is programmed to identify a target account number for a payment card from the memory. The computer device is also programmed to identify a set of transaction times associated with the target account number from the memory. The computer device is further programmed to compare the target account number to each candidate account number of a set of candidate account numbers from the memory. Comparing the target account number includes identifying a first candidate set of transaction times associated with a first candidate account number of the set of candidate account numbers. Comparing the target account number also includes comparing the target set of transaction times to the first candidate set of transaction times. Comparing the target account number further includes identifying the first candidate account number as a match candidate if the target set of transaction times and the first candidate set of transaction times do not include overlapping transactions.

In yet another aspect, at least one non-transitory computer-readable storage media having computer-executable instructions embodied thereon is provided. When executed by at least one processor, the computer-executable instructions cause the processor to identify a target account number for a payment card from a transaction database. The computer-executable instructions also cause the processor to identify a set of transaction times associated with the target account number from the transaction database. The computer-executable instructions also cause the processor to compare the target account number to each candidate account number of a set of candidate account numbers from the transaction database. Comparing the target account number includes identifying a first candidate set of transaction times associated with a first candidate account number of the set of candidate account numbers. Comparing the target account number also includes comparing the target set of transaction times to the first candidate set of transaction times. Comparing the target account number further includes identifying the first candidate account number as a match candidate if the target set of transaction times and the first candidate set of transaction times do not include overlapping transactions.

BRIEF DESCRIPTION OF THE DRAWINGS

FIG. 1 is a simplified block diagram of an example computing device including a database, a filter, and a target account, wherein the filter filters encrypted payment card transaction information stored within the database.

FIG. 2 is a simplified block diagram illustrating a subset of transactions for other encrypted accounts created with a similar filter to that shown in FIG. 1.

FIG. 3 is an example table showing both the target account transactions from FIG. 1 and the other accounts' transactions from FIG. 2.

FIG. 4 is an example method of associating ownership between payment cards using the encrypted account information and transaction data shown in FIGS. 1-3.

FIG. 5 is illustrates an example configuration of a client system that may be used to analyze encrypted transaction data.

FIG. 6 is a simplified block diagram of an example encrypted transaction analysis system including a plurality of computer devices connected in communication in accordance with the present disclosure.

FIG. 7 shows an example configuration of a database within a computing device, along with other related computing components, that may be used to analyze encrypted transaction data.

DETAILED DESCRIPTION OF THE DISCLOSURE

Figure 1:
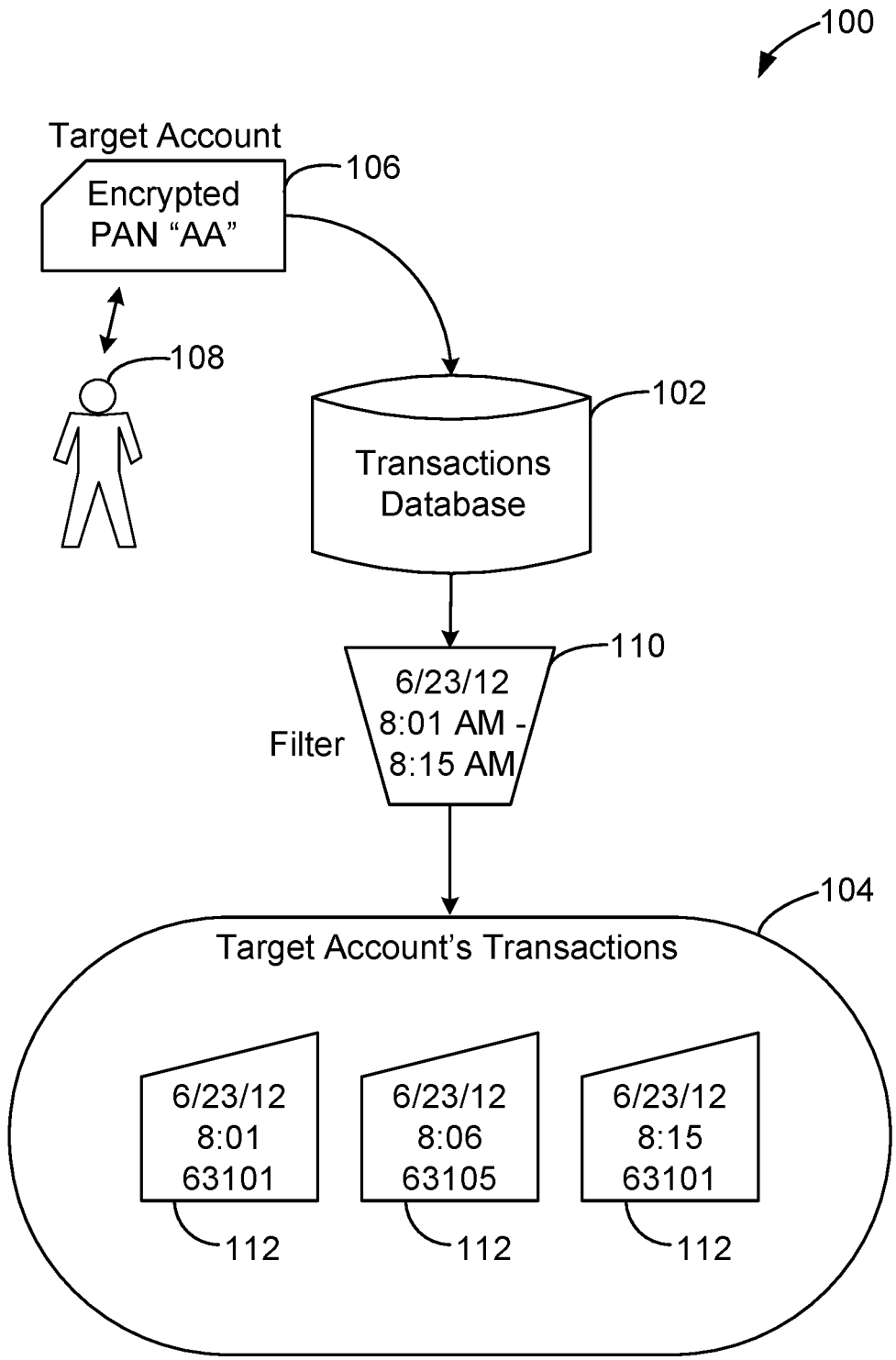
FIGS. 1-7 show example embodiments of the methods and systems described herein.

The methods and systems described herein include analyzing encrypted transaction data associated with payment card accounts. The methods and systems described herein facilitate determining common ownership amongst multiple, anonymous accounts. In one embodiment, a target account is identified. The target account has a first encrypted, or otherwise anonymized, account identifier and is associated with a "target consumer". The target account may also be associated with a geographic area (e.g., an area in which the payment card is frequently used), such as where the target consumer resides. A transaction database contains encrypted transaction information associated with the target account, as well as other accounts (i.e., "candidate accounts"). One or more of these candidate accounts may also be associated with the target consumer.

To associate the target account with one or more of the candidate accounts, the system identifies a set of transactions associated with the target account (i.e., "target account transactions"), using a filter on the transaction database. In one embodiment, the filter identifies the target account transactions within a certain time period, such as all transactions for the target account in a particular calendar year. The system also identifies another set of transactions associated with other encrypted accounts (i.e., "candidate account transactions"), using a similar filter on the transaction database. These candidate account transactions are identified using the same time period filter. The candidate account transactions may also be filtered by geographical region to limit the scope of candidates to a region similar to the target account.

The system then compares the target account transactions to each individual candidate account represented in the candidate account transactions list, searching for candidate accounts with no "overlapping transactions". The systems and methods described herein include the presumption that a single consumer (i.e., the target consumer) will not use multiple different payment cards within a certain period of time (i.e., within a single segment of time). For example, in one embodiment, time is divided into discrete segments of time, such as 1-minute segments of time. When the target account transactions are compared to a candidate account's transactions, if the two accounts (i.e., the target account and the candidate account) each have a transaction occurring within the same 1-minute time segment (i.e., they have at least one "overlapping transaction"), then they are presumed to be associated with different consumers (i.e., they are probably not commonly owned). If, on the other hand, there are no overlapping transactions between the target account and a candidate account, then the two accounts may be commonly owned. The systems and methods described herein compare sets of transactions between accounts in order to associate multiple payment cards with a common owner.

The example embodiments described herein include anonymized payment card data that has been anonymized through the mechanism of encryption. Alternatively, any other type of anonymization of payment card data that enables operation of the systems and methods as described herein may be used.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the invention by way of example and not by way of limitation. It is contemplated that the invention has general application to transaction analysis.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram 100 of an example computing device 101 including a database 102, a filter 110, and a target account 106, wherein filter 110 filters encrypted payment card transaction information stored within database 102. Database 102 has payment card transaction information stored therein, including payment card information that is encrypted. Target account 106, in some embodiments, is associated with a payment card, such as a consumer's 108 credit card or debit card. Target account 106, in FIG. 1, includes an encrypted Personal Account Number ("PAN") of "AA" for identification purposes (i.e., the encrypted PAN "AA" represents the encrypted PAN of consumer's 108 payment card). In some embodiments, the individual identity of target consumer 108 is known by computing system 101. However, it should be understood that the individual identity of target consumer 108 and target account 106 is not necessary to practice the systems and methods described herein.

Transaction database 102, in the example embodiment, includes various transaction data associated with payment cards such as target account 106 and other payment card accounts. The transaction data includes encrypted PANs, as well as transaction dates and times. The transaction data may also include transaction locations (e.g., information such as the zip code of the merchant processing the transaction, or the location of where the consumer physically initiated the transaction). In some embodiments, transaction locations are identifiable by a zip code or the like.

Also, in the example embodiment, computing device 101 applies filter 110 to transaction database 102 to generate filtered subset of transactions 104, also referred to herein as the target set of transactions. Filter 110 restricts target set of transactions 104 to just transactions involving target account 106 during a particular period of time (e.g., between 8:01 AM and 8:15 AM on 6/23/12, in the FIG. 1 example). Target set of transactions 104, in the example, includes three individual transactions 112 in the example time period, one at 8:01 AM, a second at 8:06 AM, and a third at 8:15 AM. It should be understood that the example embodiment illustrated in FIGS. 1-3 utilize a brief time period of, for example, 15 minutes, broken up into 1-minute time segments, for the purposes of illustrative simplicity. Other embodiments may use much broader periods of time, such as months or years of transaction data, in order to gain a broader view of account transaction activity. Some embodiments may not filter on time at all, instead taking all transactions associated with target account 106 from transaction database 102. In at least some embodiments, transactions analysis results may be improved when using additional data, such as using transaction data collected over a greater length of time.

Figure 2:
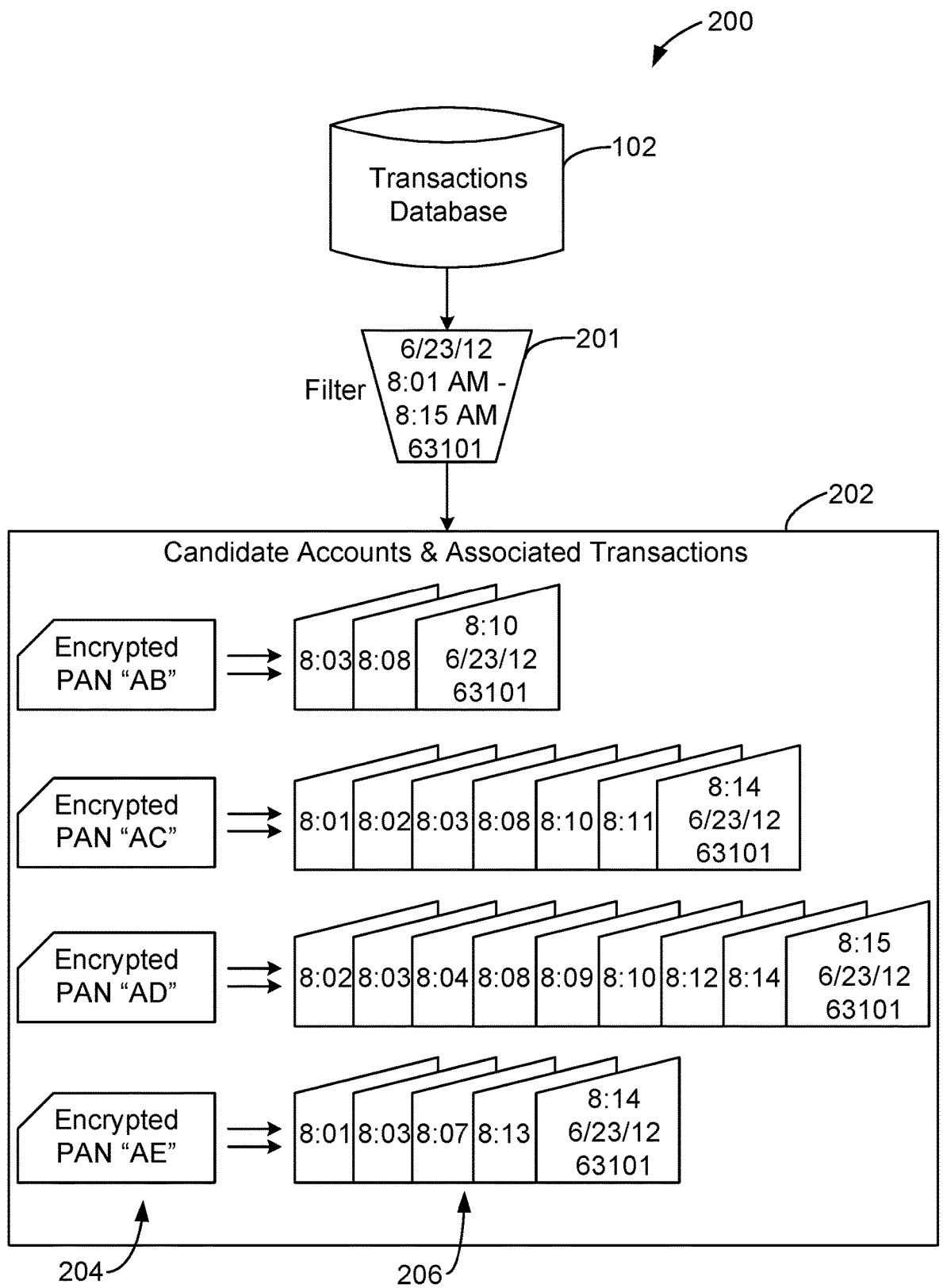

FIG. 2 is a simplified block diagram 200 illustrating another subset of transactions 202 for other encrypted accounts selected from database 102 with a similar filter 201 to that shown in FIG. 1. Subset of transactions 202 shown in FIG. 2 is also referred to herein as candidate set of transaction (i.e., transactions associated with accounts that are potential "candidates" to be associated with consumer 108 and target account 106 (both shown in FIG. 1)). Candidate set of transactions 202, in the example embodiment, includes sets of transactions 206 associated with a plurality of encrypted PANs 204.

Candidate set of transactions 202 is selected from database 102 using a filter similar to filter 110 (shown in FIG. 1). In the example embodiment, filter 201 includes the same time period filter used to construct target account transactions 104 (shown in FIG. 1). In some embodiments, filter 201 also includes a geographical filter component, such as a zip code associated with the transaction. For example, filter 201 may have included only transactions initiated in zip code "63101", the zip code where consumer 108 conducts a majority of his/her transactions with target account 106. As such, all of the transactions 206 included within candidate set of transactions 202 are only those transactions that occurred between 8:01 AM and 8:15 AM within the zip code "63101". In at least some embodiments, transaction analysis results may be improved when transaction data is limited to a geographic region. Geographical filtering may help to exclude potential candidate accounts that might show as false positives. For example, a candidate account may be excluded if it has no transactions, or less than a certain threshold number of transactions such as 5 transactions, in the same region as the target account.

Further, in some embodiments, filter 201 excludes transactions and their transaction times if the transactions are associated with recurring payments, refunds, tax payments, and/or card-not-present transactions. Such candidate and/or target transactions may create false negatives. For example, assume a candidate account "XX" is actually owned by the same consumer owning the target account "AA". Additionally, assume that candidate account "XX" has a recurring payment, such as a gym membership of the consumer, and the recurring payment happens to process at a time "8:01

AM, 6/23/12". Suppose, also, that the consumer stops by her favorite coffee shop on her way to work, and charges her morning coffee with her "AA" account during the same time segment, "8:01 AM, 6/23/12". The recurring payment on her "XX" payment card happens to create a transaction that conflicts with another transaction on her "AA" card. Thus, unless these types of payments are excluded, there is a danger that some false negatives will result in a failed match between cards.

In the example embodiment, there are four candidate accounts 204 that have transactions that pass through filter 201. Each candidate account 204 has a corresponding set of transactions 206 that will be compared against target set of transactions 104, as discussed in greater detail below.

Figure 3:
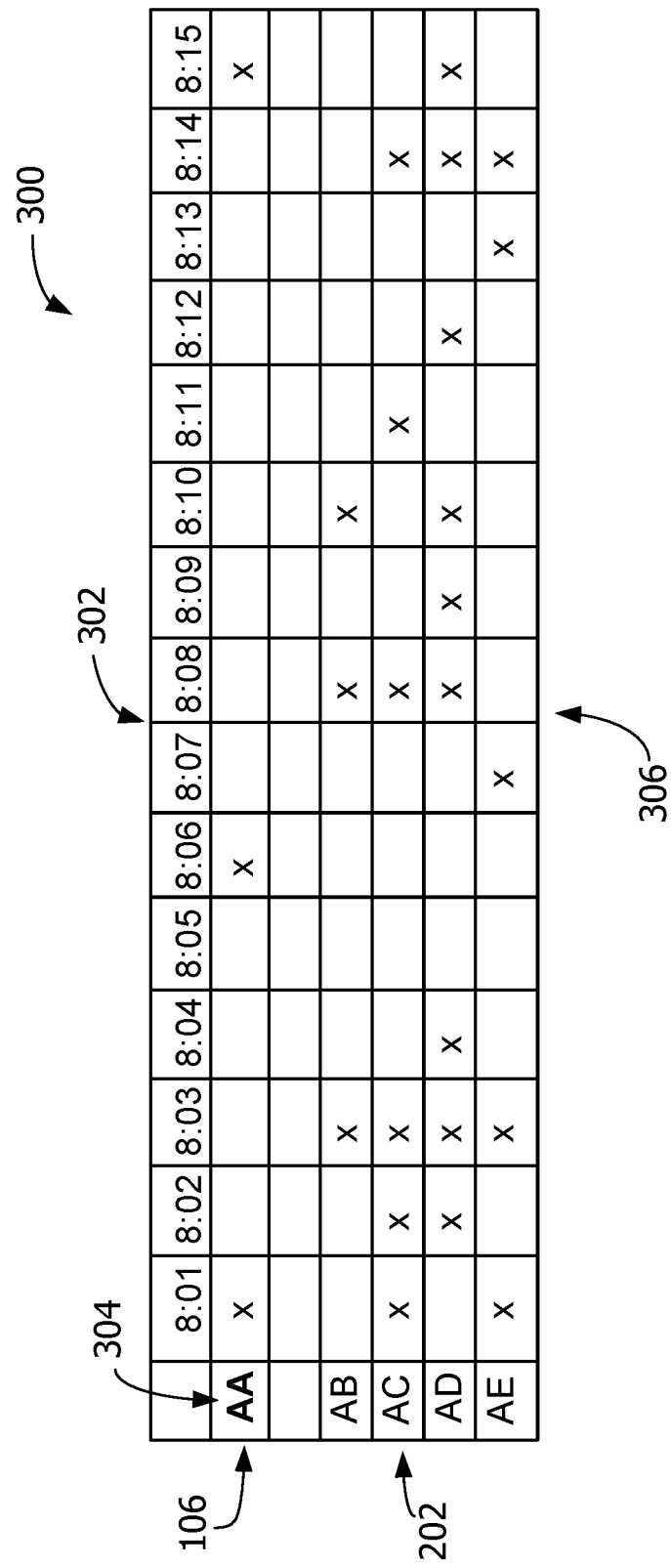

FIG. 3 is an example table 300 showing both the target account transactions 104 from FIG. 1 and the candidate set of transactions 202 from FIG. 2. Table 300 divides time into individual segments of time 302, such as "8:05 AM", "8:06 AM", etc., represented across the horizontal axis. Down the vertical axis is each account 304 involved in the transactional analysis. The target account 106, "AA", from FIG. 1 is represented as the top row. Each of the candidate accounts 202 from FIG. 2, "AB", "AC", "AD", and "AE", are represented each with an individual row below target account 104. Each individual cell in table 300 represents whether or not a transaction has occurred for the corresponding account 304 during the given segment of time 302. The presence of an "X" in the cell indicates that a transaction occurred during the particular segment of time 302 for the corresponding account 304.

During operation, a comparison occurs between the target account 106 transactions (i.e., the "AA" row of data), and each candidate account 202 (i.e., each row "AB", "AC", etc.). If an individual candidate account 202 has no "overlapping transactions" with the target account (i.e., no transactions occurring in the same segment of time 302 as a target account transaction 106), then that candidate account 202 is identified as a match candidate with respect to target account 106. As well, if there are one or more overlapping transactions between target account 106 and the individual candidate account 202, then that candidate account 202 is considered unlikely to be associated with consumer 108 and target account 106.

With the example data shown in FIG. 3, during comparison of target account 106 "AA" and candidate account 202 "AB", no overlapping transactions are identified. Target account 106 "AA" has three transactions, one at "8:01", a second at "8:06", and a third at "8:15". Candidate account 202 "AB" also has three transactions, one at "8:03", a second at "8:08", and a third at "8:10". Because none of the "AB" transactions occur during the same time segments as the "AA" transactions, "AB" is identified as a potential match candidate to the "AA" target account 106.

Further, as target account 106 "AA" is likewise compared to the other three candidate accounts, "AC", "AD", and "AE", each of these other candidate accounts have one or more overlapping transactions conflicting with "AA". For example, "AC" and "AE" both have a transaction occurring during the "8:01" time segment, causing a direct conflict with the "8:01" "AA" transaction. Further, the "AD" account has an "8:15" transaction, causing a direct conflict with the "8:15" "AA" transaction. As such, candidate accounts "AC", "AD", and "AE" are considered to not likely be potential match candidates with target account 106 "AA". As used herein, the term "direct conflict" generally refers to transactions that overlap (i.e., transactions that occur within the same time segment).

In the example embodiment, the length of time for each time segment 302 is a fixed length of one minute. In other embodiments, the length of time for each time segment is a fixed length of time, for example between one second and ten minutes. In other words, a time period such as, for example, a calendar year, is broken up into discrete, non-overlapping segments of time having a fixed length, and that fixed length may be as short as one second or as long as ten minutes. Further, it should be understood that the tablature view shown in FIG. 3 is for illustrative purposes, and not necessarily representative of the computational mechanics involved in processing these systems and methods.

Figure 4:
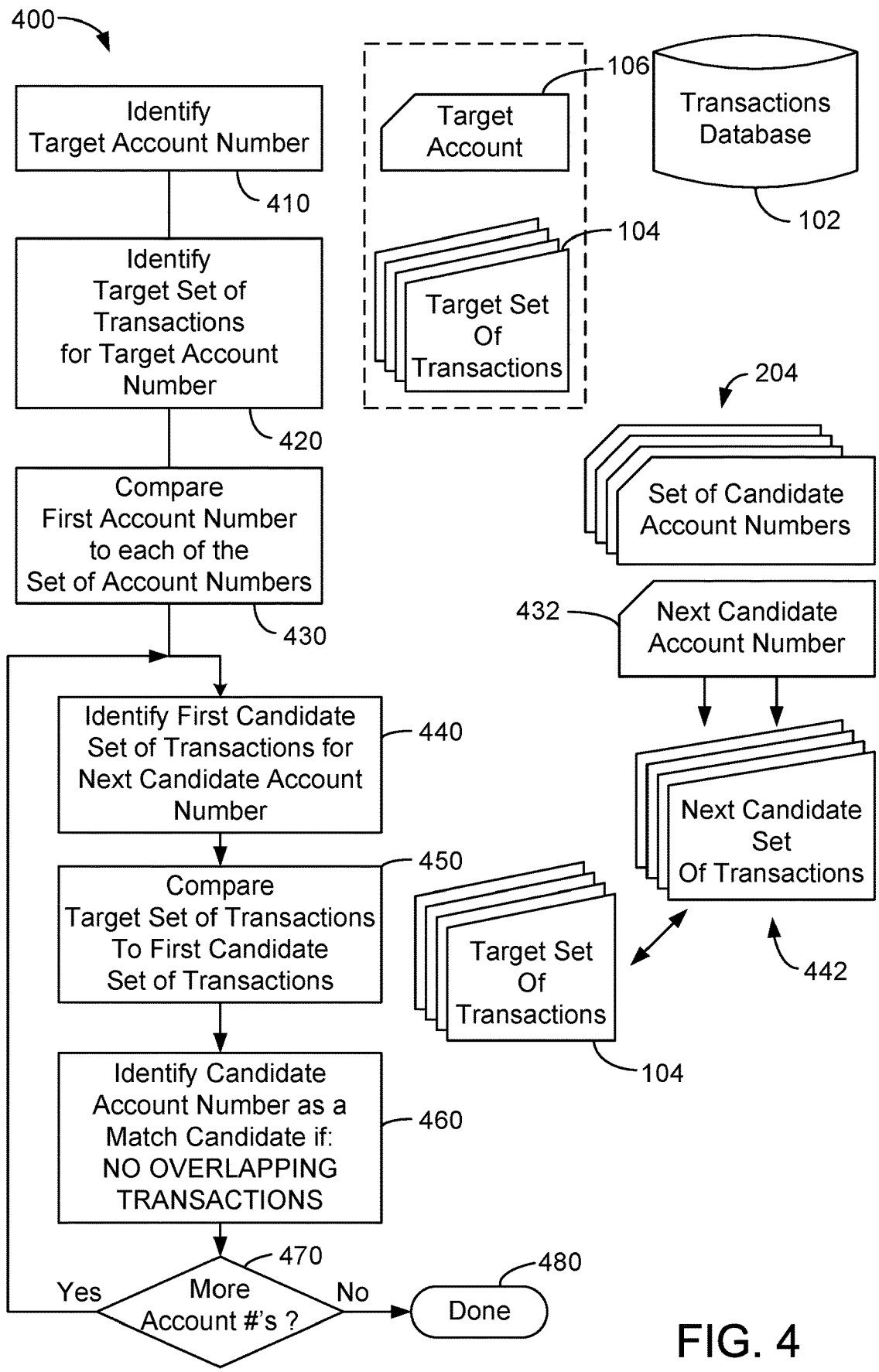

FIG. 4 is an example method 400 of associating ownership between payment cards using the encrypted account information and transaction data shown in FIGS. 1-3. A target account number 106 is identified 410. Target account number 106, in some embodiments, is identified from transaction database 102. Alternatively, any method of identifying target account number 106 that facilitates the systems and methods as described herein may be used. Target account 106 includes an encrypted target account number used to identify 420 a target set of transactions 104 associated with target account 106. In the example embodiment, target set of transactions 104 is identified 420 from transaction database 102. Further, target set of transactions 104 is identified 420 using a filter to restrict target set of transactions 104, such as filter 110 (shown in FIG. 1) based on certain criteria such as date of the transaction.

Method 400 then compares 430 the target account 106 to each candidate account in set of candidate account numbers 204. In some embodiments, set of candidate account numbers 204 is identified from transaction database 102 using a filter such as filter 201 (shown in FIG. 2). More specifically, comparison 430 of target account 106 to each candidate account includes individual comparisons of the target set of transactions 104 to a set of transactions associated with the individual candidate account, such as one of the sets of transactions 206 (shown in FIG. 2).

Comparison 430, in the example embodiment, is an iterative process in which target set of transactions 104 is compared to a next candidate account number 432 from set of candidate account numbers 204. Comparison 430 includes identifying 440 a next candidate set of transactions 442 associated with next candidate account number 432 from transaction database 102. Target set of transactions 104 is then compared 450 to next candidate set of transactions 442 in a process similar to that described above. If target set of transactions 104 has no overlapping transactions with next candidate set of transactions 442, then next candidate account number 432 is identified 460 as a match candidate with target account 106. If 470 there are more candidate account numbers in set of account numbers 204, then comparison 430 repeats with another candidate account number until comparison 430 is done 480.

Figure 5:
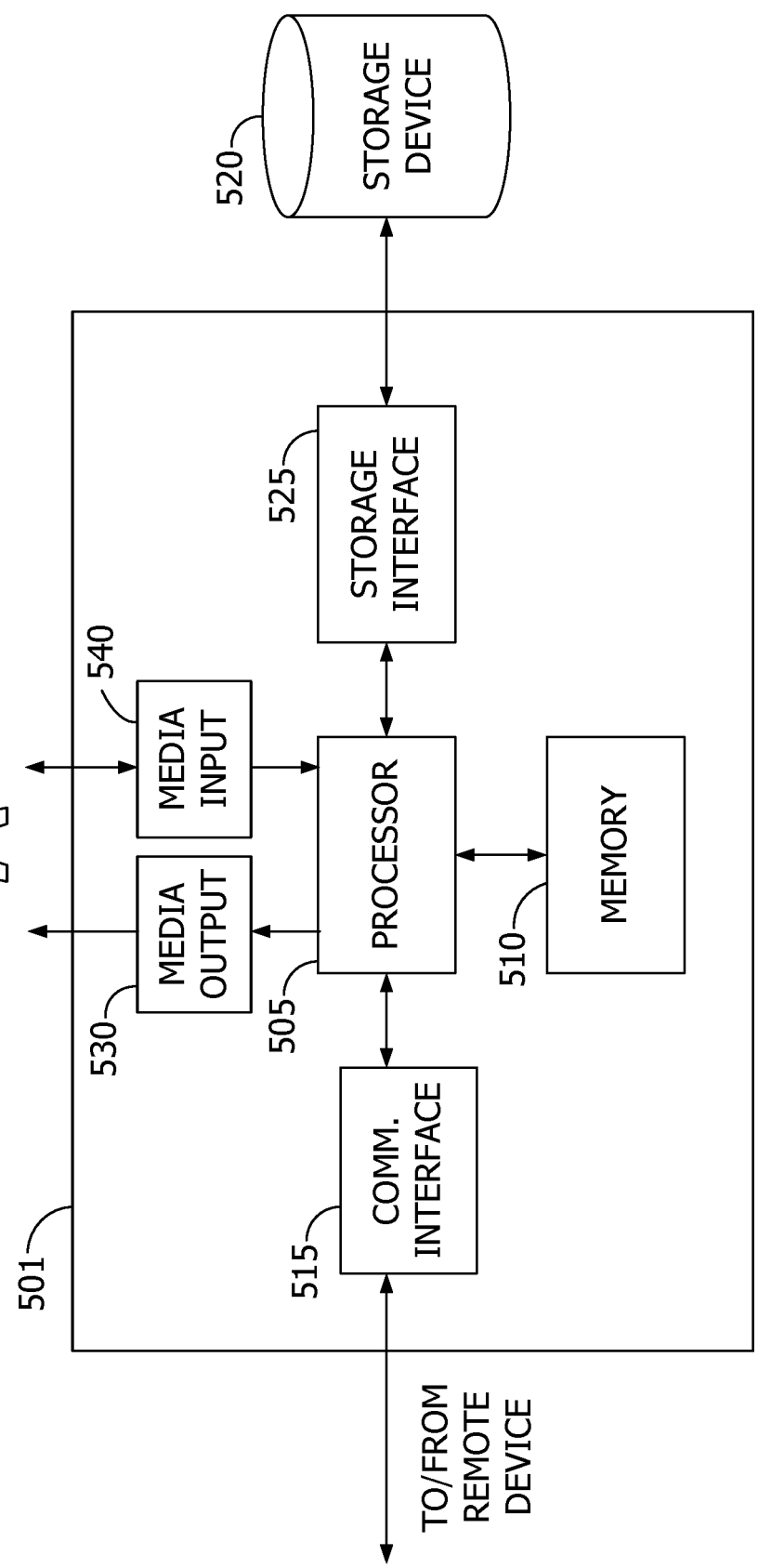

FIG. 5 illustrates an example configuration of a computing system 501 that may be used to analyze encrypted transaction data. In some embodiments, computing system 501 is similar to computing system 101 (shown in FIG. 1). In the example embodiment, computing system 501 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

Computing system 501 also includes at least one media output component 530 for presenting information to user 535. Media output component 530 is any component capable of conveying information to user 535. In some embodiments, media output component 530 includes an output adapter such as a video adapter and/or an audio adapter. An output adapter is operatively coupled to processor 505 and operatively couplable to an output device such as a display device, a liquid crystal display (LCD), organic light emitting diode (OLED) display, or "electronic ink" display, or an audio output device, a speaker or headphones.

In some embodiments, computing system 501 includes an input device 540 for receiving input from user 535. Input device 540 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 530 and input device 540. Computing system 501 may also include a communication interface 515, which is communicatively couplable to a remote device. Communication interface 515 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 510 are, for example, computer readable instructions for providing a user interface to user 535 via media output component 530 and, optionally, receiving and processing input from input device 540. A user interface may include, among other possibilities, a web browser and client application. Web browsers enable users, such as user 535, to display and interact with media and other information typically embedded on a web page or a website. A client application allows user 535 to interact with a server application.

Processor 505 may also be operatively coupled to a storage device 520. Storage device 520 is any computer-operated hardware suitable for storing and/or retrieving data. In some embodiments, storage device 520 is integrated in server system 501. For example, computing system 501 may include one or more hard disk drives as storage device 520. In other embodiments, storage device 520 is external to computing system 501 and may be accessed by a plurality of computing systems 501. For example, storage device 520 may include multiple storage units such as hard disks or solid state disks in a redundant array of inexpensive disks (RAID) configuration. Storage device 520 may include a storage area network (SAN) and/or a network attached storage (NAS) system.

In some embodiments, processor 505 is operatively coupled to storage device 520 via a storage interface 525. Storage interface 525 is any component capable of providing processor 505 with access to storage device 520. Storage interface 525 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 525 with access to storage device 520.

In operation, in the example embodiment, user 535, such as an administrative data analyst, uses computing system 501 to interact with transaction database 102 (shown in FIG. 1) hosted by server systems. User 535 initiates transaction data analysis operations as described herein.

Figure 6:
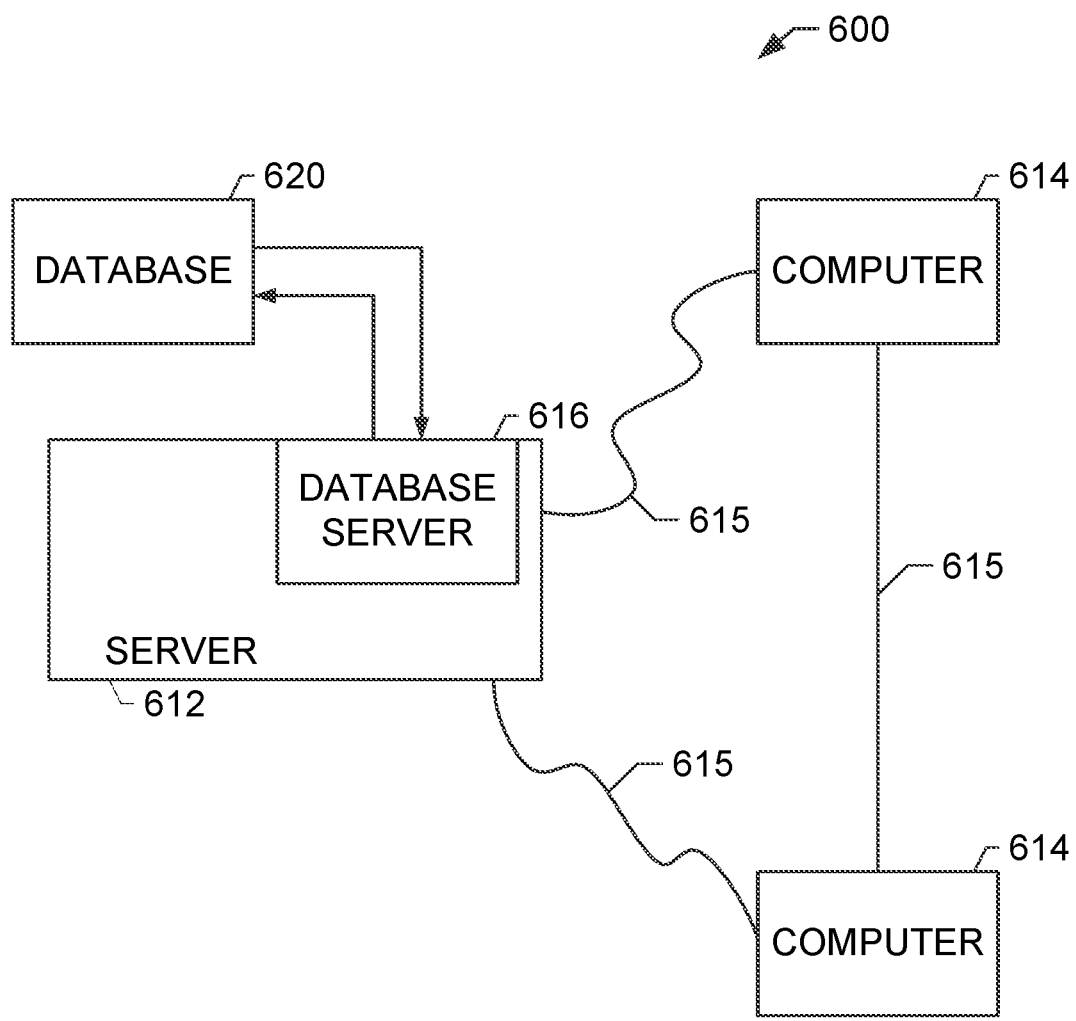

FIG. 6 is a simplified block diagram of an example encrypted transaction analysis system 600 including a plurality of computer devices connected in communication in accordance with the present disclosure. In the example embodiment, system 600 is used for storing and/or analyzing encrypted transaction data associated with payment cards.

More specifically, in the example embodiment, system 600 includes a server system 612, and a plurality of client sub-systems, also referred to as client systems 614, connected to server system 612. In one embodiment, client systems 614 and server system 612 are computers similar to computing system 501 (shown in FIG. 5) or computing device 101 (shown in FIG. 1). Client systems 614 are interconnected to the Internet through many interfaces including a network 615, such as a local area network (LAN) or a wide area network (WAN), dial-in-connections, cable modems, special high-speed Integrated Services Digital Network (ISDN) lines, and RDT networks. Client systems 614 could be any device capable of interconnecting to the Internet including a web-based phone, PDA, or other web-based connectable equipment.

In the example embodiment, a database server 616 operates on server system 612, and is connected to database 620, which contains information on a variety of matters, as described above. In one embodiment, centralized database 620 can be accessed by potential users at one of client systems 614 by logging onto database server 612 through one of client systems 614. In an alternative embodiment, database 620 is stored remotely from database server system 612 and may be non-centralized.

Database 620 may include a single database having separated sections or partitions, or may include multiple databases, each being separate from each other. Database 620 may store transaction data generated over the processing network including data relating to merchants, account holders, prospective customers, issuers, acquirers, and/or purchases made. Database 620 may also store account data including at least one of an encrypted primary account number, a transaction date and time, and a transaction location. Database 620 may also store merchant data including a merchant identifier that identifies each merchant registered to use the network, and instructions for settling transactions including merchant bank account information. Database 620 may also store purchase data associated with items being purchased by a cardholder from a merchant, and authorization request data.

Figure 7:
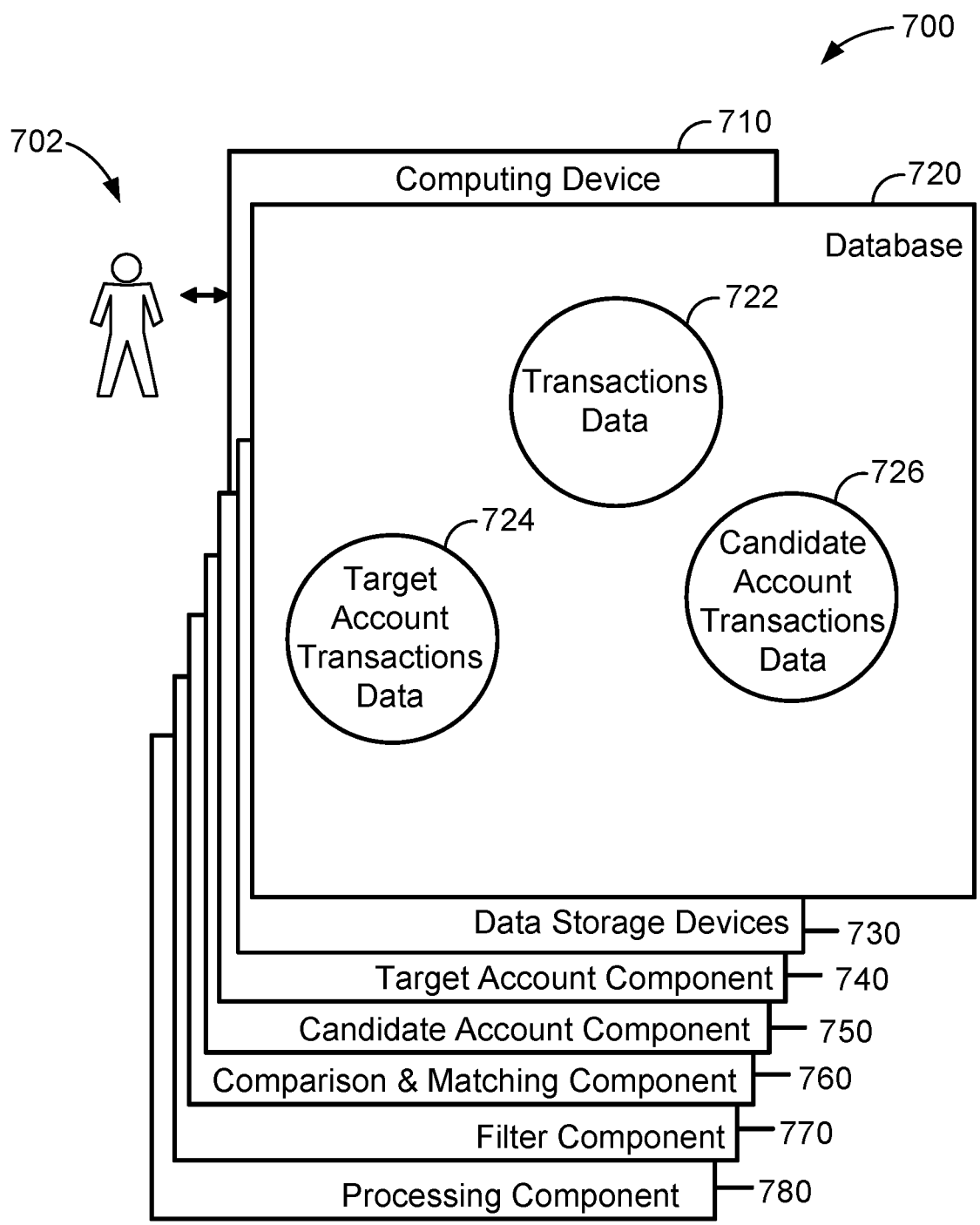

FIG. 7 shows an example configuration 700 of a database 720 within a computing device 710, along with other related computing components, that may be used to analyze encrypted transaction data. In some embodiments, computing device 710 is similar to computing device 101 (shown in FIG. 1) and/or server system 612 (shown in FIG. 6). Database 720 may be coupled to several separate components within computing device 710, which perform specific tasks.

In the exemplary embodiment, database 720 includes transactions data 722, target account transactions data 724, and candidate account transactions data 726. In some embodiments, database 720 is similar to transaction database 102 (shown in FIG. 1) and/or database 620 (shown in FIG. 6). Transactions data 722 includes information associated with payment card transactions including encrypted primary account numbers. Target account transactions data 724 includes transactions and other information on one or more target accounts 106 (shown in FIG. 1), such as target account transactions 104 (shown in FIG. 1). Candidate account transactions data 726 includes transactions and other information associated with other payment card accounts, such as candidate accounts 204 (shown in FIG. 2) and candidate set of transactions 202 (shown in FIG. 2).

Computing device 710 includes the database 720, as well as data storage devices 730. Computing device 710 also includes a target account component 740 for identifying the target account transaction data 724 in database 720. Computing device 710 also includes a candidate account transaction component 750 for identifying the candidate account transaction data 726. A comparison and matching component 760 is also included for comparing candidate accounts with target accounts, as well as a filter component 770 for filtering data from database 720. A processing component 780 assists with execution of computer-executable instructions associated with the transaction analysis system.

The above-described embodiments of methods and systems of associating common ownership of payment cards using encrypted payment card information. The system compares transaction data associated with a target account and a candidate account. If the target account transaction data contains no overlapping transactions with a particular candidate account's transaction data, then the system considers that candidate account as a potential match with the target account. As a result, the methods and systems described herein facilitate correlating ownership between payment cards when the underlying ownership information is not known, such as when the payment card data is encrypted.

As will be appreciated based on the foregoing specification, the above-described embodiments of the disclosure may be implemented using computer programming or engineering techniques including computer software, firmware, hardware or any combination or subset thereof, wherein the technical effect is identifying a target account, identifying a set of transaction times associated with the target account from a transaction database, comparing the target account to each candidate account of a set of candidate accounts from the transaction database, wherein comparing includes identifying a first candidate set of transactions associated with a first candidate account, comparing the target set of transactions to the first set of transactions, and identifying the candidate account as a match candidate if the target set of transactions and the candidate set of transactions have no overlapping transactions. Any such resulting program, having computer-readable code means, may be embodied or provided within one or more computer-readable media, thereby making a computer program product (i.e., an article of manufacture) according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. In other words, the machine-readable medium and the computer-readable medium described herein are non-transitory. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for linking encrypted records, said method using a computer device including a processor in communication with a database, the database storing a plurality of transaction records each including one of a plurality of encrypted identifiers and a respective transaction time, said method comprising:

selecting, by the processor, a target encrypted identifier of the plurality of encrypted identifiers from the database;

filtering, by the processor from the transaction records, a plurality of target transaction records, the target transaction records being associated with the target encrypted identifier and having the transaction time within a time period;

designating, by the processor, a subset of the plurality of encrypted identifiers as candidate identifiers, the subset not including the target encrypted identifier;

filtering, by the processor for each candidate encrypted identifier from the transaction records, a plurality of candidate transaction records, the candidate transaction records being associated with the candidate encrypted identifier and having the transaction time within the time period;

generating, by the processor, a two-dimensional data structure comprising a plurality of cells, wherein a first dimension of the data structure is defined by a series of time segments extending from a beginning to an end of the time period, each time segment having a duration in a range from one second to ten minutes, wherein a second dimension of the data structure is defined by a series of encrypted identifiers including the target encrypted identifier and the candidate encrypted identifiers, and wherein each cell corresponds to an intersection of one of the time segments along the first dimension and one of the series of encrypted identifiers along the second dimension;

populating, by the processor, the data structure by (i) flagging, for each of the candidate encrypted identifiers, each cell corresponding along the second dimension to the candidate encrypted identifier and along the first dimension to each of the time segments that encompasses the transaction time of at least one of the associated candidate transaction records, and (ii) flagging, for the target encrypted identifier, each cell corresponding along the second dimension to the target encrypted identifier and along the first dimension to each of the time segments that encompasses the transaction time of at least one of the target transaction records;

parsing, by the processor, the data structure to identify flagged time segments of each candidate encrypted identifier that match flagged time segments of the target encrypted identifier;

identifying, as a candidate for linking to the target encrypted identifier, one of the candidate encrypted identifiers having no matching flagged time segment; and excluding, by the processor, the candidate encrypted identifiers having at least one matching flagged time segment from being linked to the target encrypted identifier.

2. The method of claim 1, wherein each of filtering the target transaction records and filtering the candidate transaction records further comprises:

identifying transaction records having recurring transaction times; and excluding the identified transaction records from the respective one of the target transaction records and the candidate transaction records.

3. The method of claim 1, wherein each of filtering the target transaction records and filtering the candidate transaction records further comprises:

identifying transaction records associated with refunds; and excluding the identified transaction records from the respective one of the target transaction records and the candidate transaction records.

4. The method of claim 1, further comprising identifying a primary geographic region associated with the target transaction records, wherein filtering the candidate transaction records further comprises excluding transaction records originating outside of the primary geographic region.

5. The method of claim 4, wherein each transaction record further includes a zip code in which the transaction record originated, wherein identifying the primary geographic region comprises identifying the zip code associated with a majority of the target transaction records as a primary zip code, and wherein excluding the transaction records occurring outside of the primary geographic region comprises excluding the transaction records having other than the primary zip code.

6. The method of claim 1, wherein the pre-determined time period is at least one year.

7. The method of claim 1, wherein the series of time segments is non-overlapping.

8. A computer device for linking encrypted records, said computer device comprising a processor communicatively coupled to a database, the database storing a plurality of transaction records each including one of a plurality of encrypted identifiers and a respective transaction time, said computer device programmed to:

select a target encrypted identifier of the plurality of encrypted identifiers from the database;

filter from the transaction records a plurality of target transaction records, the target transaction records being associated with the target encrypted identifier and having the transaction time within a time period;

designate a subset of the plurality of encrypted identifiers as candidate identifiers, the subset not including the target encrypted identifier;

filter, for each candidate encrypted identifier from the transaction records, a plurality of candidate transaction records, the candidate transaction records being associated with the candidate encrypted identifier and having the transaction time within the time period;

generate a two-dimensional data structure comprising a plurality of cells, wherein a first dimension of the data structure is defined by a series of time segments extending from a beginning to an end of the time period, each time segment having a duration in a range from one second to ten minutes, wherein a second dimension of the data structure is defined by a series of encrypted identifiers including the target encrypted identifier and the candidate encrypted identifiers, and wherein each cell corresponds to an intersection of one of the time segments along the first dimension and one of the series of encrypted identifiers along the second dimension;

populate the data structure by (i) flagging, for each of the candidate encrypted identifiers, each cell corresponding along the second dimension to the candidate encrypted identifier and along the first dimension to each of the time segments that encompasses the transaction time of at least one of the associated candidate transaction records, and (ii) flagging, for the target encrypted identifier, each cell corresponding along the second dimension to the target encrypted identifier and along the first dimension to each of the time segments that encompasses the transaction time of at least one of the target transaction records;

parse the data structure to identify flagged time segments of each candidate encrypted identifier that match flagged time segments of the target encrypted identifier;

identify, as a candidate for linking to the target encrypted identifier, one of the candidate encrypted identifiers having no matching flagged time segment; and exclude the candidate encrypted identifiers having at least one matching flagged time segment from being linked to the target encrypted identifier.

9. The computer device of claim 8, further programmed to each of filter the target transaction records and filter the candidate transaction records by further:

identifying transaction records having recurring transaction times; and excluding the identified transaction records from the respective one of the target transaction records and the candidate transaction records.

10. The computer device of claim 8, further programmed to each of filter the target transaction records and filter the candidate transaction records by further:

identifying transaction records associated with refunds; and excluding the identified transaction records from the respective one of the target transaction records and the candidate transaction records.

11. The computer device of claim 8, further programmed to:

identify a primary geographic region associated with the target transaction records; and filter the candidate transaction records by further excluding transaction records originating outside of the primary geographic region.

12. The computer device of claim 11, wherein each transaction record further includes a zip code in which the transaction record originated, the computer device further programmed to:

identify the primary geographic region by identifying the zip code associated with a majority of the target transaction records as a primary zip code; and exclude the transaction records occurring outside of the primary geographic region by excluding the transaction records having other than the primary zip code.

13. The computer device of claim 8, wherein the pre-determined time period is at least one year.

14. The computer device of claim 8, wherein the series of time segments is non-overlapping.

15. At least one non-transitory computer-readable storage media having computer-executable instructions embodied thereon for linking encrypted records, wherein when executed by at least one processor coupled to a database, the database storing a plurality of transaction records each including one of a plurality of encrypted identifiers and a respective transaction time, the computer-executable instructions cause the at least one processor to:

select a target encrypted identifier of the plurality of encrypted identifiers from the database;

filter from the transaction records a plurality of target transaction records, the target transaction records being associated with the target encrypted identifier and having the transaction time within a time period;

designate a subset of the plurality of encrypted identifiers as candidate identifiers, the subset not including the target encrypted identifier;

filter, for each candidate encrypted identifier from the transaction records, a plurality of candidate transaction records, the candidate transaction records being associated with the candidate encrypted identifier and having the transaction time within the time period;

generate a two-dimensional data structure comprising a plurality of cells, wherein a first dimension of the data structure is defined by a series of time segments extending from a beginning to an end of the time period, each time segment having a duration in a range from one second to ten minutes, wherein a second dimension of the data structure is defined by a series of encrypted identifiers including the target encrypted identifier and the candidate encrypted identifiers, and wherein each cell corresponds to an intersection of one of the time segments along the first dimension and one of the series of encrypted identifiers along the second dimension;

populate the data structure by (i) flagging, for each of the candidate encrypted identifiers, each cell corresponding along the second dimension to the candidate encrypted identifier and along the first dimension to each of the time segments that encompasses the transaction time of at least one of the associated candidate transaction records, and (ii) flagging, for the target encrypted identifier, each cell corresponding along the second dimension to the target encrypted identifier and along the first dimension to each of the time segments that encompasses the transaction time of at least one of the target transaction records;

parse the data structure to identify flagged time segments of each candidate encrypted identifier that match flagged time segments of the target encrypted identifier;

identify, as a candidate for linking to the target encrypted identifier, one of the candidate encrypted identifiers having no matching flagged time segment; and exclude the candidate encrypted identifiers having at least one matching flagged time segment from being linked to the target encrypted identifier.

16. The at least one non-transitory computer-readable storage media of claim 15, wherein the computer-executable instructions further cause the processor to each of filter the target transaction records and filter the candidate transaction records by further:

identifying transaction records having recurring transaction times; and excluding the identified transaction records from the respective one of the target transaction records and the candidate transaction records.

17. The at least one non-transitory computer-readable storage media of claim 15, wherein the computer-executable instructions further cause the processor to:

identify a primary geographic region associated with the target transaction records; and filter the candidate transaction records by further excluding transaction records originating outside of the primary geographic region.

18. The at least one non-transitory computer-readable storage media of claim 17, wherein each transaction record further includes a zip code in which the transaction record originated, and wherein the computer-executable instructions further cause the processor to:

identify the primary geographic region by identifying the zip code associated with a majority of the target transaction records as a primary zip code; and exclude the transaction records occurring outside of the primary geographic region by excluding the transaction records having other than the primary zip code.

19. The at least one non-transitory computer-readable storage media of claim 15, wherein the pre-determined time period is at least one year.

20. The at least one non-transitory computer-readable storage media of claim 15, wherein the series of time segments is non-overlapping.

* * * * *